United States Patent
Khan et al.

(10) Patent No.: US 10,856,251 B2
(45) Date of Patent: *Dec. 1, 2020

(54) REQUESTING A LOCATION OF A USER

(71) Applicant: MICROSOFT TECHNOLOGY LICENSING, LLC, Redmond, WA (US)

(72) Inventors: Rubaiyat Khan, Redmond, WA (US); Alice Jane Brush, Bellevue, WA (US); Peter Eberhardy, Seattle, WA (US); March Rogers, Bellevue, WA (US); Bojana Ostojic, Seattle, WA (US); Nathaniel Eric Breskin Auer, Redmond, WA (US); Stefanie Danhope, Redmond, WA (US); Abigail Welborn, Redmond, WA (US); Daniel Larsen, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/883,167

(22) Filed: Jan. 30, 2018

(65) Prior Publication Data
US 2018/0227875 A1    Aug. 9, 2018

Related U.S. Application Data

(63) Continuation of application No. 13/919,479, filed on Jun. 17, 2013, which is a continuation-in-part of application No. 13/409,905, filed on Mar. 1, 2012.

(51) Int. Cl.
*H04W 64/00* (2009.01)
*H04W 4/029* (2018.01)
(Continued)

(52) U.S. Cl.
CPC ........... *H04W 64/00* (2013.01); *G01S 5/0009* (2013.01); *G06F 21/6245* (2013.01);
(Continued)

(58) Field of Classification Search
CPC ....... H04L 67/18; H04L 67/22; H04L 63/104; H04W 4/02; H04W 4/08; H04W 76/02;
(Continued)

(56) References Cited

U.S. PATENT DOCUMENTS 6,968,179 B1 * 11/2005 De Vries ............. H04L 12/5895
455/414.1
7,190,960 B2     3/2007 Wilson et al.
(Continued)

OTHER PUBLICATIONS

"Find My Friends App Goes Live Ahead of IOS 5 Release", Retrieved from https://web.archive.org/web/20111013033058/http://9to5mac.com/2011/10/12/find-my-friends-app-goes-live-ahead-of-ios-5-release/, Oct. 12, 2011, 10 Pages.
(Continued)

*Primary Examiner* — Allahyar Kasraian

(57) ABSTRACT

A user sends a location request to a user of a group that requests the user's current location. For example, one family member may send a location request to another family member that is part of their family group for their current location. The user receiving the request may accept the location request or reject the location request. When the location request is reject, the requesting user is not provided with the current location information of the user. When the location request is accepted, the requesting user is provided with the current location information of the user. In addition to providing the location information to the requesting user, the location may also be shared with other members of the group. For example, a message may be sent to each of the family members that are part of the group that informs them that a member has updated their location.

20 Claims, 13 Drawing Sheets

(51) Int. Cl.
  *G06F 21/62*  (2013.01)
  *G01S 5/00*  (2006.01)
  *H04W 4/08*  (2009.01)
  *H04W 4/50*  (2018.01)
  *H04W 76/45*  (2018.01)
(52) U.S. Cl.
  CPC ..... *H04W 4/029* (2018.02); *G06F 2221/2111* (2013.01); *H04W 4/08* (2013.01); *H04W 4/50* (2018.02); *H04W 76/45* (2018.02)
(58) Field of Classification Search
  CPC ..... H04W 4/008; H04W 4/023; H04W 4/206; G06F 3/04842; G06F 3/013
  USPC .............................................. 455/456.1–457
  See application file for complete search history.

(56) References Cited

U.S. PATENT DOCUMENTS

| | | | | |
|---|---|---|---|---|
| 7,840,226 B1* | 11/2010 | Walsh | .................. | H04L 63/107 455/456.1 |
| 8,036,677 B2* | 10/2011 | Khan | .................. | H04W 8/14 455/412.1 |
| 8,751,582 B1* | 6/2014 | Behforooz | ............ | H04L 51/043 709/206 |
| 2003/0154293 A1* | 8/2003 | Zmolek | .................. | H04L 63/08 709/228 |
| 2006/0183486 A1* | 8/2006 | Mullen | .................. | H04W 8/14 455/456.1 |
| 2006/0223518 A1* | 10/2006 | Haney | .................. | H04W 4/21 455/420 |
| 2007/0049290 A1* | 3/2007 | Mullen | .................. | H04W 8/14 455/456.1 |
| 2008/0045232 A1* | 2/2008 | Cone | .................. | H04W 4/02 455/456.1 |
| 2008/0132252 A1* | 6/2008 | Altman | .............. | G06Q 30/0207 455/457 |
| 2008/0133708 A1* | 6/2008 | Alvarado | ............ | G06Q 10/109 709/218 |
| 2008/0227473 A1* | 9/2008 | Haney | .................. | H04W 4/21 455/457 |
| 2008/0244005 A1* | 10/2008 | Sengupta | ................ | H04L 51/04 709/204 |
| 2009/0300525 A1* | 12/2009 | Jolliff | ................ | H04M 1/72544 715/764 |
| 2010/0004005 A1* | 1/2010 | Pereira | .................. | H04W 4/02 455/457 |
| 2010/0205242 A1 | 8/2010 | Marchioro et al. | | |
| 2010/0325194 A1* | 12/2010 | Williamson | ............ | H04W 4/02 709/203 |
| 2011/0151890 A1* | 6/2011 | Platt | .................. | G06Q 10/107 455/456.1 |
| 2011/0294520 A1* | 12/2011 | Zhou | .................. | H04W 48/04 455/456.1 |
| 2012/0008526 A1* | 1/2012 | Borghei | ................ | H04W 4/021 370/254 |
| 2012/0302256 A1* | 11/2012 | Pai | .......................... | H04W 4/02 455/456.2 |
| 2013/0232552 A1* | 9/2013 | Brush | .................. | G06F 21/6263 726/4 |
| 2014/0213295 A1* | 7/2014 | Conklin | ................ | H04W 4/029 455/456.2 |

OTHER PUBLICATIONS

"VIMOCOS—Vienna Mobile Context Sharing", Retrieved from http://www.infosys.tuwien.ac.at/prototypes/VIMOCOS/VIMOCOS_index.html, Retrieved on Jan. 2, 2012, 2 Pages.
"Final Office Action Issued in U.S. Appl. No. 13/409,905", dated Apr. 14, 2015, 18 Pages.
"Final Office Action Issued in U.S. Appl. No. 13/409,905", dated Nov. 19, 2013, 13 Pages.
"Non Final Office Action Issued in U.S. Appl. No. 13/409,905", dated Nov. 3, 2014, 15 Pages.
"Non Final Office Action Issued in U.S. Appl. No. 13/409,905", dated Jan. 12, 2016, 22 Pages.
"Office Action Issued in U.S. Appl. No. 13/919,479", dated Jan. 6, 2017, 16 Pages.
"Final Office Action Issued in U.S. Appl. No. 13/919,479", dated Aug. 13, 2015, 18 Pages.
"Non Final Office Action Issued in U.S. Appl. No. 13/919,479", dated Jan. 2, 2015, 14 Pages.
"Non Final Office Action Issued in U.S. Appl. No. 13/919,479", dated May 3, 2016, 9 Pages.
"Non Final Office Action Issued in U.S. Appl. No. 13/919,479", dated Feb. 3, 2015, 16 Pages.
Brian, Matt, "Space-Time for iOS: The Simple App that Lets You Request a Person's Location Regardless of their Smartphone", Retrieved from https://thenextweb.com/apple/2012/04/20/spacetime-for-ios-the-simple-app-that-lets-you-request-a-persons-location-regardless-of-their-smartphone/, Apr. 20, 2012, 4 Pages.
Consolvo, et al., "Location Disclosure to Social Relations: Why, When, & What People Want to Share", Retrieved from https://homes.cs.washington.edu/~lamarca/pubs/chi05-locDisSocRel-proceedings.pdf, Apr. 2, 2005, 10 Pages.
Harper, et al., "Glancephone—An Exploration of Human Expression", In Proceedings of the 11th International Conference on Human-Computer Interaction with Mobile Devices and Services, Sep. 15, 2009, 10 Pages.
Lee, et al., "Mobile Phone-To-Phone Personal Context Sharing", In 9th International Symposium on Communications and Information Technology, Sep. 28, 2009, 6 Pages.
Miluzzo, et al., "Sensing Meets Mobile Social Networks: The Design, Implementation and Evaluation of the CenceMe Application", In Proceedings of the 6th ACM conference on Embedded Network Sensor Systems, Nov. 5, 2008, pp. 337-350.
Nagpal, Bharat, "We're In, Location Sharing App from Microsoft Released for WP7", Retrieved from https://web.archive.org/web/20130913125331/http://www.igyaan.in/15078/in-location-sharing-app-microsoft-released-wp7/, Aug. 19, 2011, 12 Pages.
Oh, et al., "A Mobile Context Sharing System using Activity and Emotion Recognition with Bayesian Networks", In 7th Symposia and Workshop on Ubiquitous, Autonomic & Trusted Computing, Oct. 26, 2010, pp. 244-249.
Raento, et al., "Context Phone: A Prototyping Platform for Context-Aware Mobile Applications", In Journal of IEEE Pervasive Computing, vol. 4, Issue 2, Jan. 2005, pp. 51-59.
Webster, Scott, "Location Sharing App Glympse Gets Major Update", Retrieved from https://web.archive.org/web/20160610224208/http://www.androidguys.com:80/2012/10/16/location-sharing-app-glympse-gets-major-update/, Oct. 16, 2012, 5 Pages.
Wilson, Mark, "Finally, A Location-Sharing App That's Less Creepy Than Foursquare", Retrieved from https://web.archive.org/web/20120715194911/https://www.fastcodesign.com/1670275/finally-a-location-sharing-app-thats-less-creepy-than-foursquare, Jul. 11, 2012, 8 Pages.
"Notice of Allowance Issued in U.S. Appl. No. 13/919,479", dated Feb. 9, 2018, 10 Pages.
"Notice of Allowance Issued in U.S. Appl. No. 13/919,479", dated Oct. 31, 2017, 10 Pages.
"Non Final Office Action Issued in U.S. Appl. No. 13/409,905", dated Apr. 1, 2013, 12 Pages.
Mendis, Charles, "Locate your friends in real time with Google Latitude", Retrieved from https://googlemobile.blogspot.com/2009/02/locate-your-friends-in-real-time-with.html, Feb. 4, 2009, 15 Pages.
Milchman, Eli, "Everything You Need to Know About the Evil, Useful Find My Friends App [FAQ]", Retrieved from https://www.cultofmac.com/127030/everything-you-need-to-know-about-the-evil-useful-find-my-friends-faq/, Oct. 30, 2011, 16 Pages.
Santos, Elena, "Google Latitude", Retrieved from https://web.archive.org/web/20171022050108/https://google-latitude.en.softonic.com/web-apps, Retrieved on Oct. 22, 2017, 3 Pages.

* cited by examiner

Mobile Computing Device

REQUESTING A LOCATION OF A USER

RELATED APPLICATIONS

This application is a continuation of U.S. application Ser. No. 13/919,479, filed Jun. 17, 2013, entitled "REQUESTING A LOCATION OF A USER," now issued U.S. Pat. No. 10,004,056; which is a continuation-in-part of U.S. application Ser. No. 13/409,905, filed Mar. 1, 2012, entitled "AUTOMATIC CONTEXT SHARING WITH PRIVACY," which are hereby incorporated in their entirety by reference.

BACKGROUND

There are many applications and services that provide location information. Some applications display location information for: a device (e.g., a location of a computing device); a destination; or a user (e.g., the location information of a user). There are many situations in which a person may want to know where another person is currently located. For example, a parent may want to know where a family member is currently located, a worker may want to know where co-workers are located, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user sends a location request to a user of a group, which requests the user's current location. For example, one family member may send a location request to another family member, who is part of his or her family group, for that family member's current location. The user receiving the request may accept the location request or reject the location request. When the location request is rejected, the requesting user is not provided with the current location information of the user. When the location request is accepted, the requesting user is provided with the current location information of the user. In addition to providing the location information to the requesting user, the location may also be shared with other members of the group (e.g., the family group). For example, a message may be sent to each of the family members who are part of the group, which informs them that a member has updated his or her location. A member of the group may access a view that shows the updated location of the user. For example, a member of the group may access an application that displays a map of the current location of the user. The application, in that view or another view, may also show the latest location information for the other members of the group. For example, the application may display a list of the members of the group that shows each member's latest location, or the application may display a map that indicates the latest location of each member of the group.

DETAILED DESCRIPTION

Figure 1:
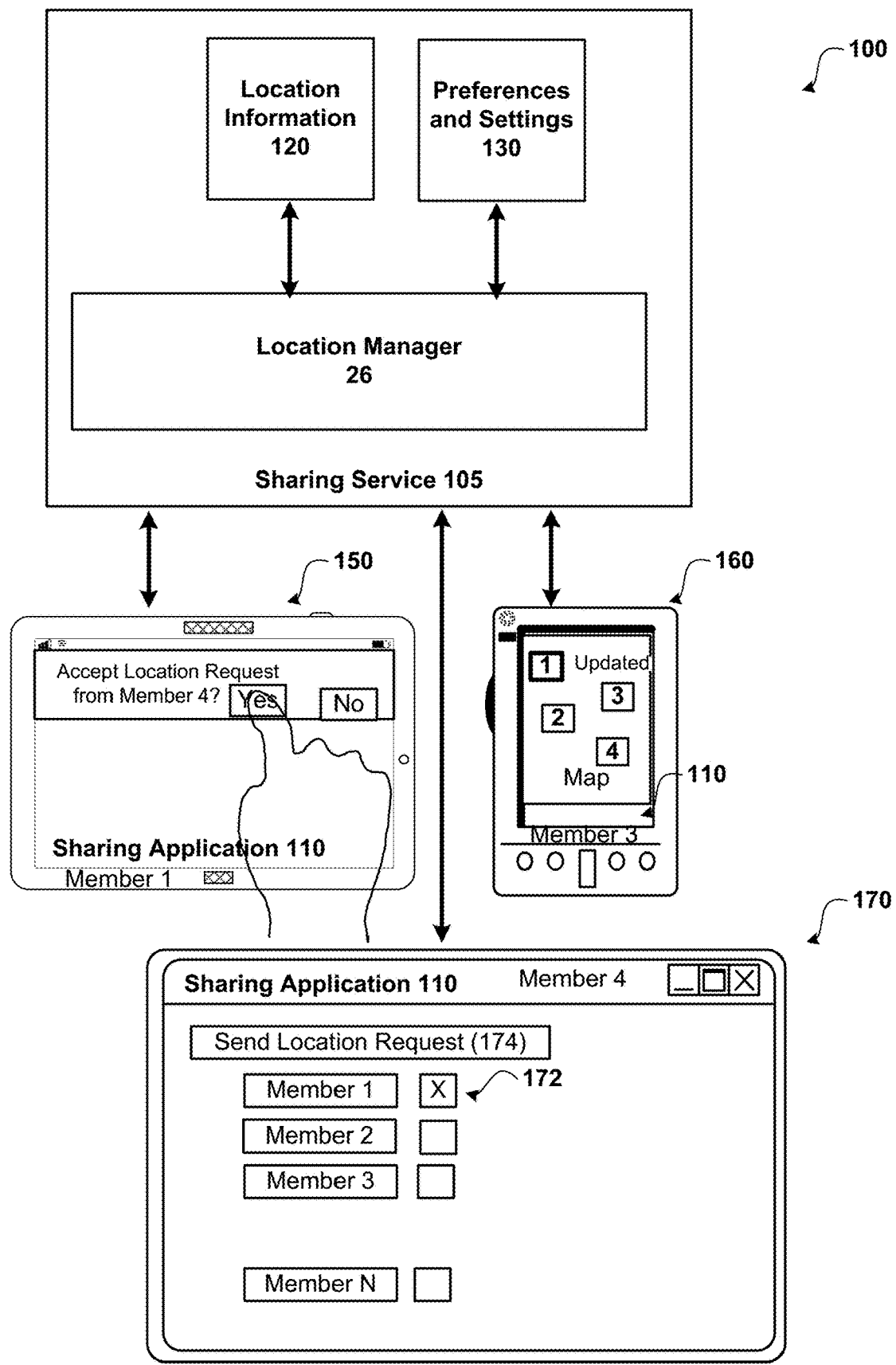
FIG. 1 shows a system for requesting a current location from a user and sharing location information when the request is accepted by the user.

Referring now to the drawings, in which like numerals represent like elements, various embodiments will be described.

FIG. 1 shows a system for requesting a current location from a user and sharing location information when the request is accepted by the user.

As illustrated, system 100 includes sharing service 105, sharing application(s) 110, location information 120, preferences and settings 130, location manager 26, tablet computing device 150, smart phone 160, and computing device 170.

Location manager 26 is configured to process location requests received from a user for a current location of another user. According to an embodiment, the location request is received from a member of a predefined group, such as members of a family. Other groups may be defined (e.g., work groups, club groups, etc.).

As illustrated, Member 4 of a group selects a user interface element 172 to request a current location of Member 1 of the group. Different methods may be used to request a current location of a group user. For example, a user interface element may be selected, a spoken command may be received, a gesture may be made, and the like. In response to the action of Member 4 sending the location request for Member 1, location manager 26 sends a location request to Member 1.

Location manager 26 determines how to deliver the location request to the user. According to an embodiment, different types of location requests may be used. For example, different message types may be used to deliver a location request. Some example message types that may be used to deliver the location request to the user (e.g., Member 1 in the current example) include, but are not limited to: toast notifications (e.g., a small informational window in the user's device or program), information bar messages (e.g., within a header area), electronic mail (emails); Short Messaging Service (SMS); Multimedia Messaging Service (MMS); Instant Messaging (IM); social network messages; and the like. Location manager 26 may select the message type using different methods. For example, location manager 26 may use contextual information to determine a commonly used message type by the user. Location manager 26 may also access preferences and settings 130 to determine a message type.

Location manager 26 delivers the location request to Member 1 using the determined message type and delivery method. In the current example, Member 1 receives the location request on tablet computing device 150 in the form of an information bar message. The user receiving the request may accept the location request or reject the location request. According to an embodiment, the user explicitly accepts the request. According to another embodiment, the user may set an option to automatically accept a request that is received from one or more other users. For example, children of the parents in a family may set options to automatically accept a location request from their parents or some other authorized user. Similarly, a user may set an option to automatically accept a location request made by one or more other users. When the location request is denied, the requesting user is not provided with the current location information of the user. When the location request is accepted, the requesting user will be provided with the current location information of the user. In the current example, Member 1 accepts the location request from Member 4 by selecting the "Yes" option.

When the user accepts a location request from another user in the group, location manager 26 determines or receives the current location information for the user. According to an embodiment, the current location information for the user is obtained from the user's device after the user accepts the location request and is sent to location manager 26. The current location for the user is then sent to the requesting member (e.g., Member 4 in this example). In addition to providing the location information to the requesting user, the location information for the user is also shared with other members of the group. For example, a message may be sent to each of the members that are part of the group that informs them that a member has updated their location. Group members may receive the same message or a different type of message. For example, some members of the group may be sent a message including the current location information and other group members may be notified that current location information for the user has been updated. After the location information is updated, a member of the group may access a current location view that shows the updated location of the user. For example, Member 3 may access sharing application 110 on smart phone 160 to see a display of a map of the current location of the user. The application may also show the latest location information for the other members of the group.

In order to facilitate communication with location manager 26, one or more callback routines may be implemented. Application 110 may be a variety of applications, such as sharing applications, travel applications, mapping applications, and the like. Generally, application 110 may be any application that requests a current location of a group member. Application 110 may be configured to receive different types of input (e.g., speech input, touch input, keyboard input (such as a physical keyboard, a Software Input Panel (SIP)), or other types of input).

System 100 as illustrated comprises one or more touch screen input devices, such as tablet computing device 150 and smart phone 160, that detects when a touch input has been received (e.g., a finger touching or nearly touching the touch screen). Any type of touch screen may be utilized that detects a user's touch input. More details are provided below.

Figure 2:
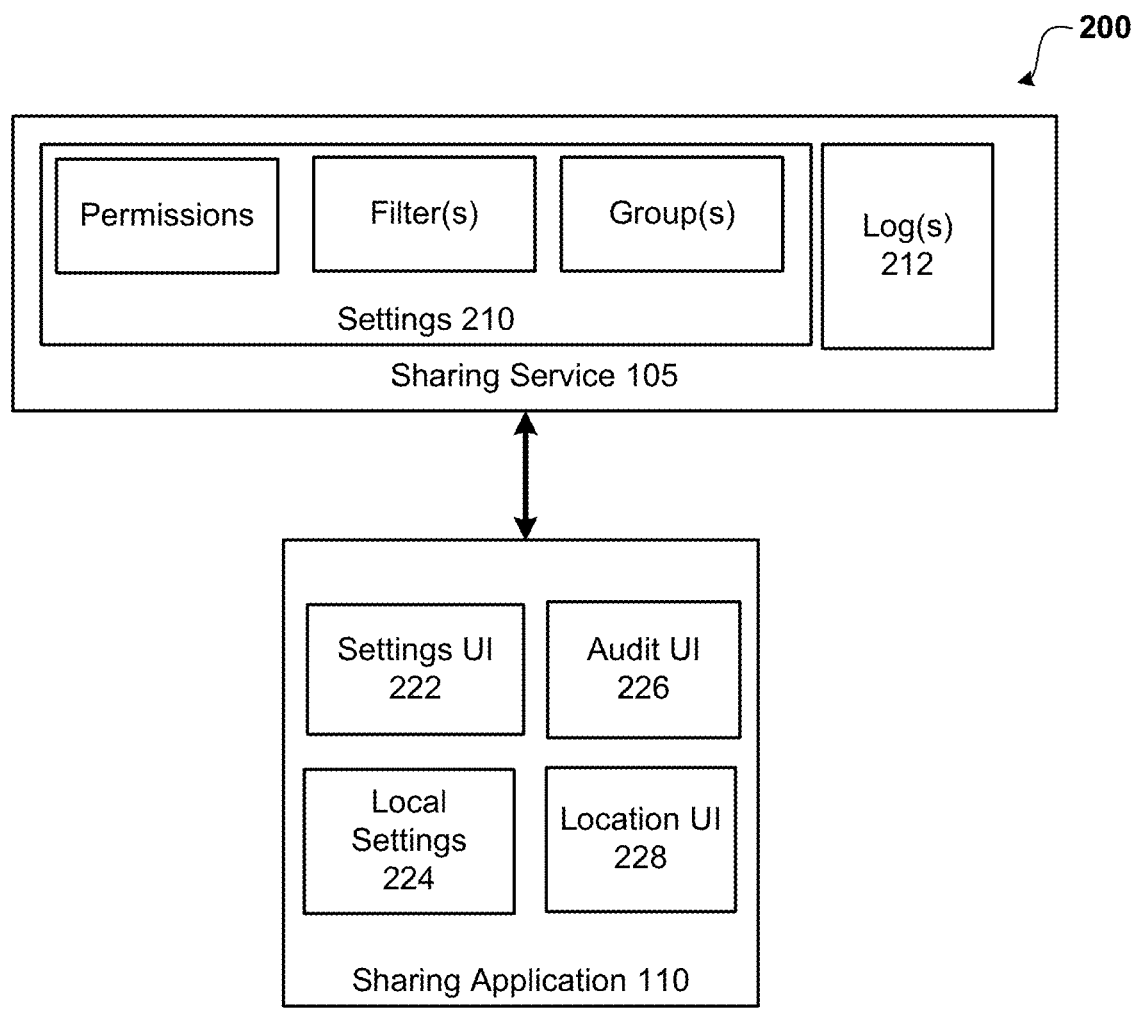
FIG. 2 shows interactions between a sharing program and a sharing service for configuring permissions.

FIG. 2 shows interactions between a sharing program and a sharing service for configuring permissions.

As illustrated, FIG. 2 shows sharing service 105 including settings 210 and log(s) 212 and sharing application 110 that includes settings user interface 222, audit user interface 226, location user interface 228 and local settings 224.

A user may configure different criteria, such as permissions, filters and group settings, that are related to the operation of the sharing application 110. For example, an authorized user may add or remove a group member from a group.

The user may set permissions that specify what information the user allows sharing service 105 to share with other members in a group. For example, a user may opt in to allow different types of information to be shared with group members before any information is shared. A user may decide to share location information with one user in a group but may choose not to share location information with another member in the group.

A user may also configure one or more filter(s) that may filter the shared information as determined by the set permissions based on various criteria (e.g., time of day, requesting device, requesting location, and the like). For example, a user may allow a user to receive location information, but would like the location information to show a general location as compared to detailed location information. The user may also configure filters to restrict an amount of information one or more members of the group can have access to. For example, a father or mother may set permission and filtering criteria that allows a caregiver to see their child's location from a computing device that is in the home of the mother and father as long as the request occurs during the caregiver's work hours. A user may also set local settings 224 such as application customization settings (e.g., color schemes, icons and the like) for use when displaying location user interface 228.

Audit user interface 226 may be used by an authorized user to view and interact with (e.g., delete) previously made/received location requests stored in log 212. Access to the log related data is limited to an authorized user who has provided the correct security credentials. The data is stored securely within log(s) 212.

Figure 3:
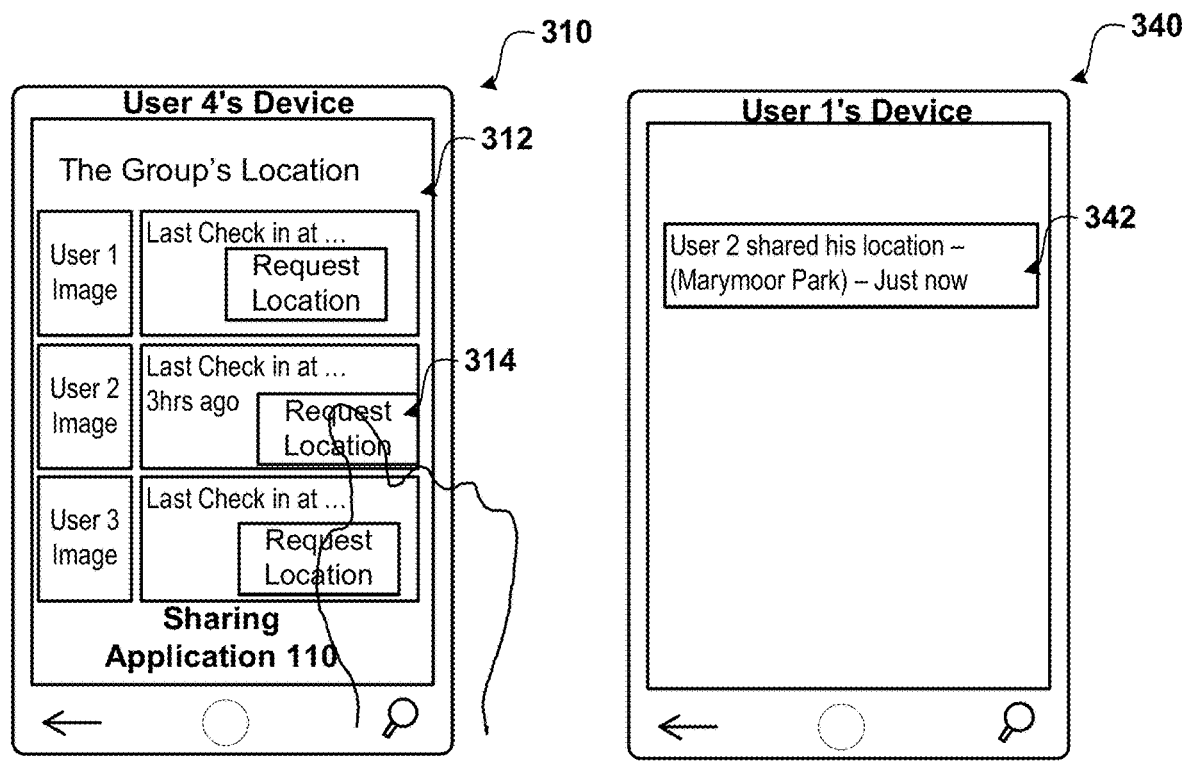
FIG. 3 shows the interactions of a user making a location request, a user responding to a location request, and the service delivering location information in response to a user accepting the location request.
Figure 3:
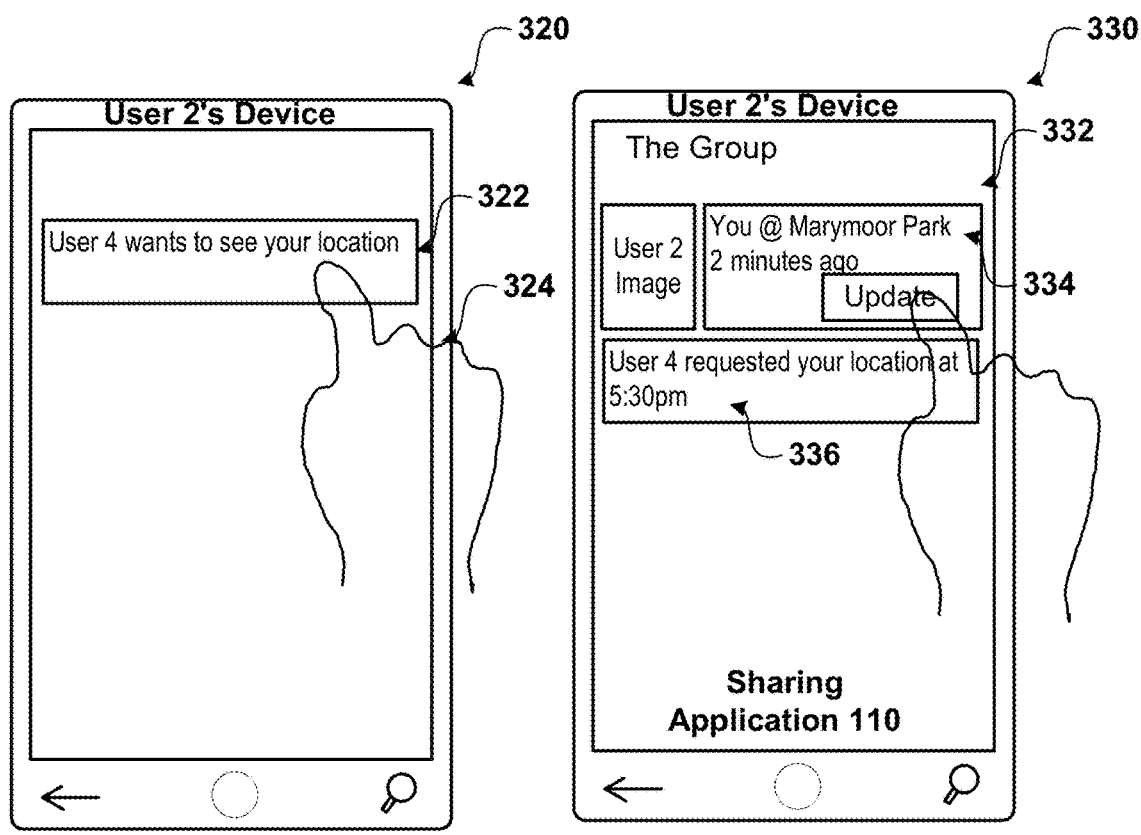

FIG. 3 shows making a location request, responding to a location request, and delivering location information in response to a user accepting the location request.

As illustrated, FIG. 3 shows display 310, display 320, display 330 and display 340.

Display 310 (User 4's device) shows an example user interface 312 for sharing application 110 that displays the last reported location information for each member of a group to which the member belongs. According to an embodiment, the group comprises family members. Other groups may be created. In the current example, the group includes four users. As illustrated on display 310, User 4 is selecting the request location user interface element 314 to send a location request to user 2 for user 2's current location. In response to the selection of the request location user interface element 314, a location request is sent to user 2. According to an embodiment, the request for user 2's location is sent to an online sharing service that sends the location request to user 2 when authorized (e.g., after checking permissions and filters).

Display 320 (User 2's device) shows message 322 that informs User 2 that User 4 wants to see his or her current location. Different types of messages may be sent to a user requesting his or her current location. In the example location request illustrated, User 2 may ignore the location request or select the message to see more information. In the current example, the user has selected message 322.

Display 330 (User 2's device) shows sharing application 110 displaying an example user interface 332, in which User 2 may decide to provide his or her current location in response to the location request from User 4. For example, example user interface 332 may be displayed in response to User 2 selecting message 322. As illustrated, example user interface 332 displays element 334 and message 336. Message 336 shows a time of the location request and who requested the location. Element 334 also shows a user's last updated location and an update element. In the current example, User 2 has decided to allow the location information to be shared and has selected the update button to share his or her current location. User 4 may also reject the request by not selecting user interface element 338. According to another embodiment, a reject user interface element may be selected to reject the request. For example, see FIG. 4 and related description.

Display 340 illustrates a device of another group member (User 1). The group member device may represent the requesting user's device as well as other group members that are authorized to receive the updated location information. As illustrated, a notification message 342 displays that User 2 shared his or her location and is at Marymoor Park. According to an embodiment, a user may select message 342 to access sharing application 110 and see a more detailed view of User 2's location (e.g., when authorized).

Figure 4:
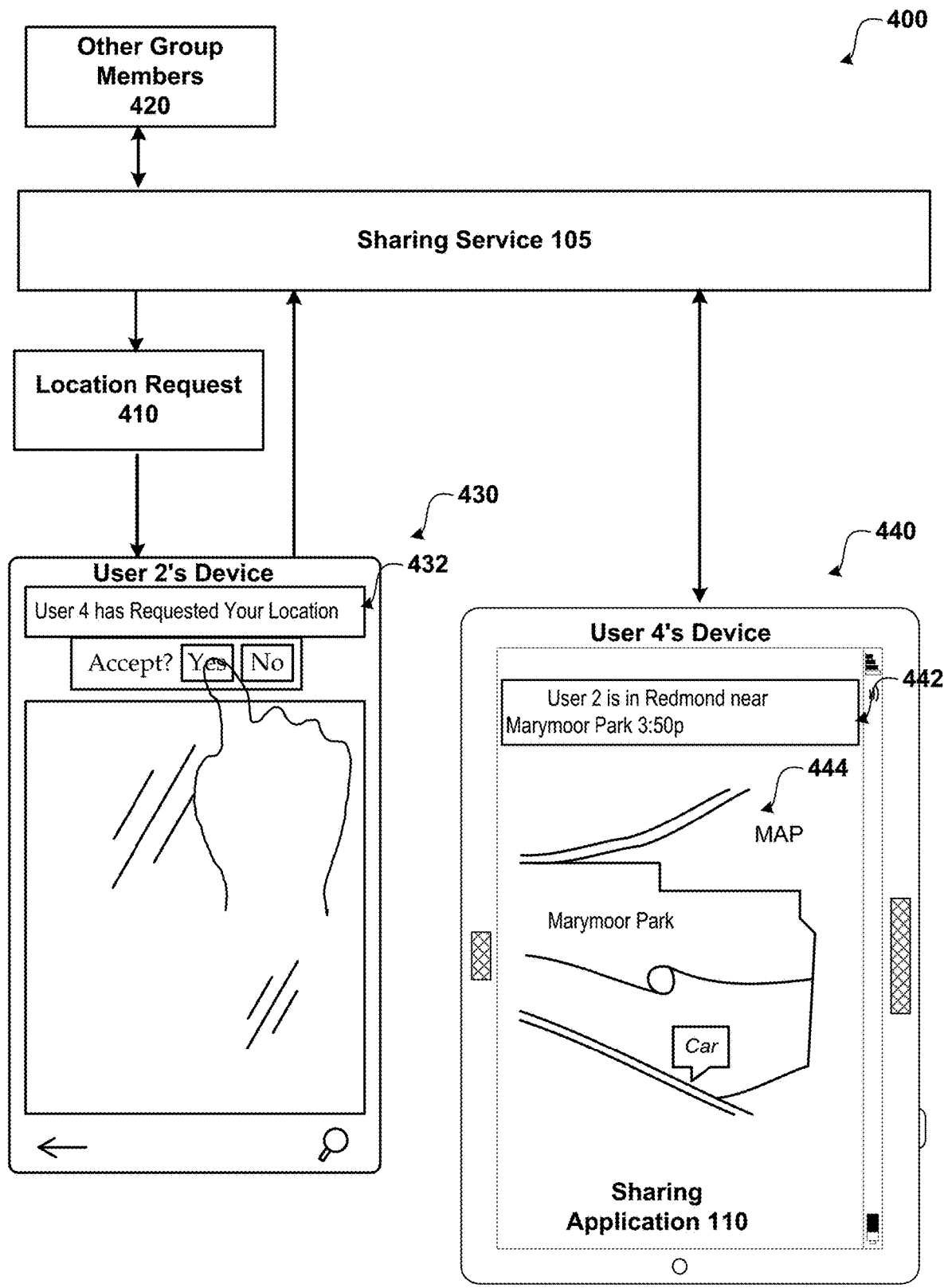
FIG. 4 shows interactions between a sharing service and a user device for sending a location request and receiving location information from within a sharing application.

FIG. 4 shows users sending a location request and receiving location information from within a sharing application.

As illustrated, location system 400 includes sharing service 105, other group members 420, location request 410, device 430 and device 440. In the current example, device 430 is a smart phone and device 440 is a tablet/slate device. Other types of computing devices may be used.

In the current example, User 4 is currently using sharing application 110 on device 440 and has already requested location information from User 2. Sharing service 105 receives location request 410 from User 4 and delivers location request 410 to User 2.

When device 430 receives location request 410, message 432 is displayed. As illustrated, message 432 includes selectable options to accept the location request or reject the location request from User 4. As discussed herein, different types of messages may be used to request the location of the user.

In response to User 2 accepting the location request, sharing service 105 obtains the current location of User 2 and shares it with other members of the group 420 that are authorized to receive the location information. The current location may be determined using automatic methods (e.g., GPS) or manual methods (e.g., user enters location). The location may be obtained from one or more sources. For example, the location may be obtained from the client device, from an external source (such as a cell service provider) or from some combination of location sources.

After receiving the location information for User 2 from sharing service 105, sharing application 110 notifies User 4 of User 2's location. Different methods may be used to deliver the location information. For example, a message, spoken output, a map, or the like may be used to deliver User's 2 location to User 4. In the current example, a notification message 442 and a map 444 showing User 2 is displayed. As illustrated, map 444 shows that User 2 is in his or her car.

Figure 5:
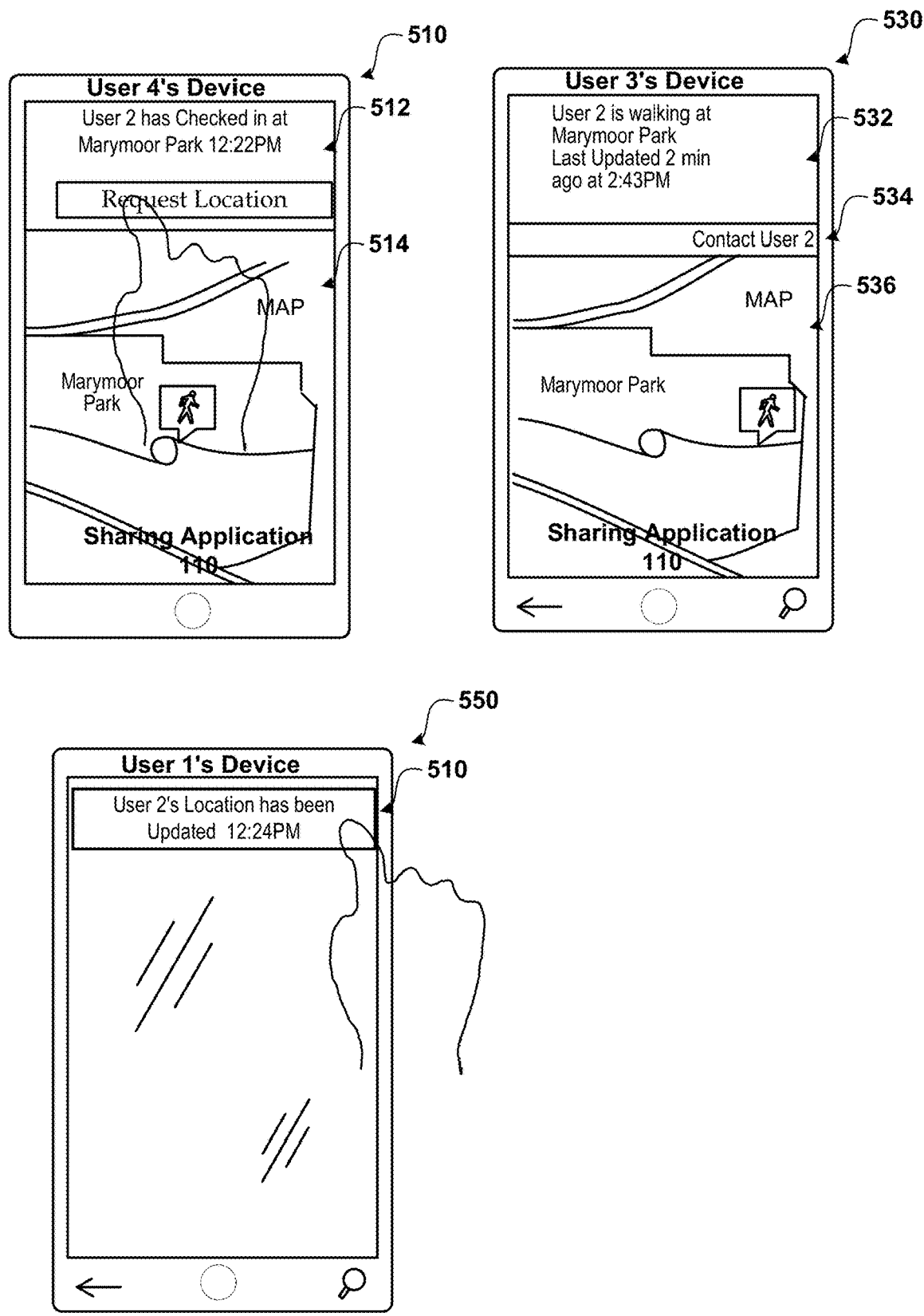
FIG. 5 shows exemplary illustrations of requesting a location for a group member and sharing the location information with the group.

FIG. 5 shows exemplary illustrations of requesting a location for a group member and sharing the location information with the group.

Device 510 shows message 512 that displays a last "check-in" of User 2. According to an embodiment, a "check-in" is a status update that is manually made by a user when they want to share their current status, such as location information. A user may check-in for a variety of different reasons. For example, a user may check-in to show that they have reached a destination. When a group member checks in, that status is provided to the other group members that are authorized to receive the status update. In the current example, a "Request Location" element is displayed near message 512 such that User 4 may easily request an update to User 2's status. Device 510 also shows map 514 that shows the last location for User 2 that was received from the sharing service.

Device 530 shows updated location information for User 2 that was received in response to User 2 accepting a location request from User 4. Message 532 shows a status message that includes the time the location was updated and how long ago the update was received. According to an embodiment, the message may also include other information (e.g., the user is walking, driving, running, etc.). This information may be restricted from being collected or delivered by the user (e.g., using an opt-in policy). Device 530 also shows map 536 that shows the last location for User 2 received from the sharing service. As can be seen by comparing map 536 to map 514, User 2 has moved.

Device 550 illustrates another group member receiving a message notifying the group member that User 2's location has been updated. In the current example, device 550 is not currently displaying a view of sharing application 110. For example, the device may be on a home page, within another application view, in a lock state, or the like.

Figure 6:
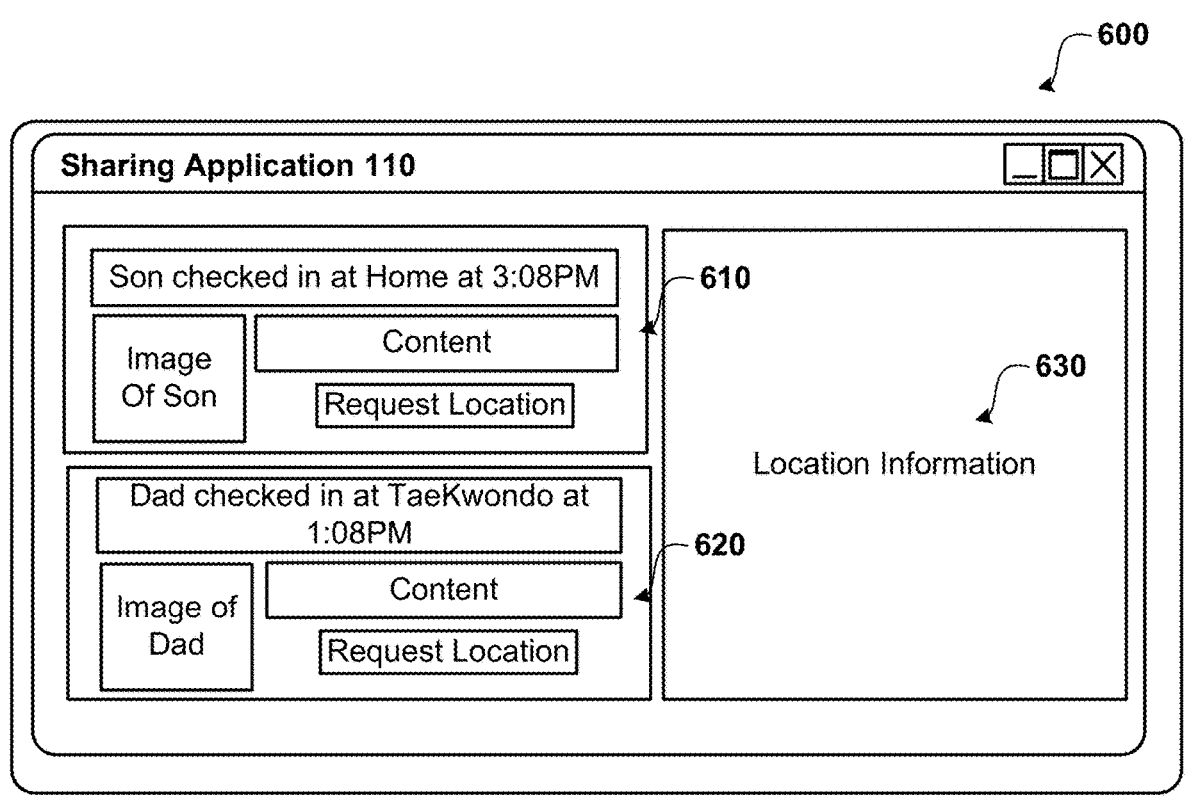
FIG. 6 shows an example location display for a sharing application.

FIG. 6 shows an example location display for a sharing application.

As illustrated, display 600 shows different members of a family group. Section 610 displays a last check-in status for the son, an image of the son, content related to the son, and a Request Location element. The content may be information related to the location and/or other content. For example, the content may display a message to the user currently viewing sharing application 110.

Section 620 displays a last check-in status for the dad, an image of the dad, content related to the dad, and a Request Location element.

More group members may be shown within display 600. For example, each group member may be shown. The user of sharing application 110 may navigate to different members of the group using an interface control or using some other method (e.g., speech, gesture, etc.).

Location information 630 may be used to display other location information related to all or a portion of the group members. For example, location information 630 may show a map for each group member, a large map showing each group member's location, and/or other representations of the group members.

Figure 7:
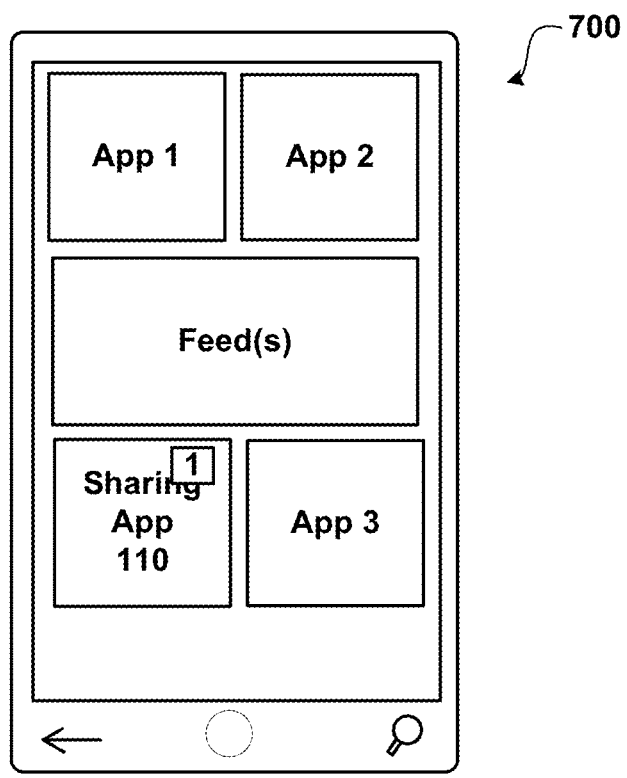
FIG. 7 shows an example home screen including a sharing application with a pending notification.

FIG. 7 shows an example home screen including a sharing application with a pending notification.

As illustrated, device 700 shows a home screen including different applications and content, including sharing application 110. In the current example, sharing application 110 shows a "1" indicator near the top right of the icon, which indicates a pending notification. For example, a toast notification may have disappeared from the display, so the home page display for the sharing application is updated to show that there is a notification pending. This notification may be an update to a location or that a location request is pending. A user may select sharing app 110 to view the pending location request or view the location update.

Figure 8:
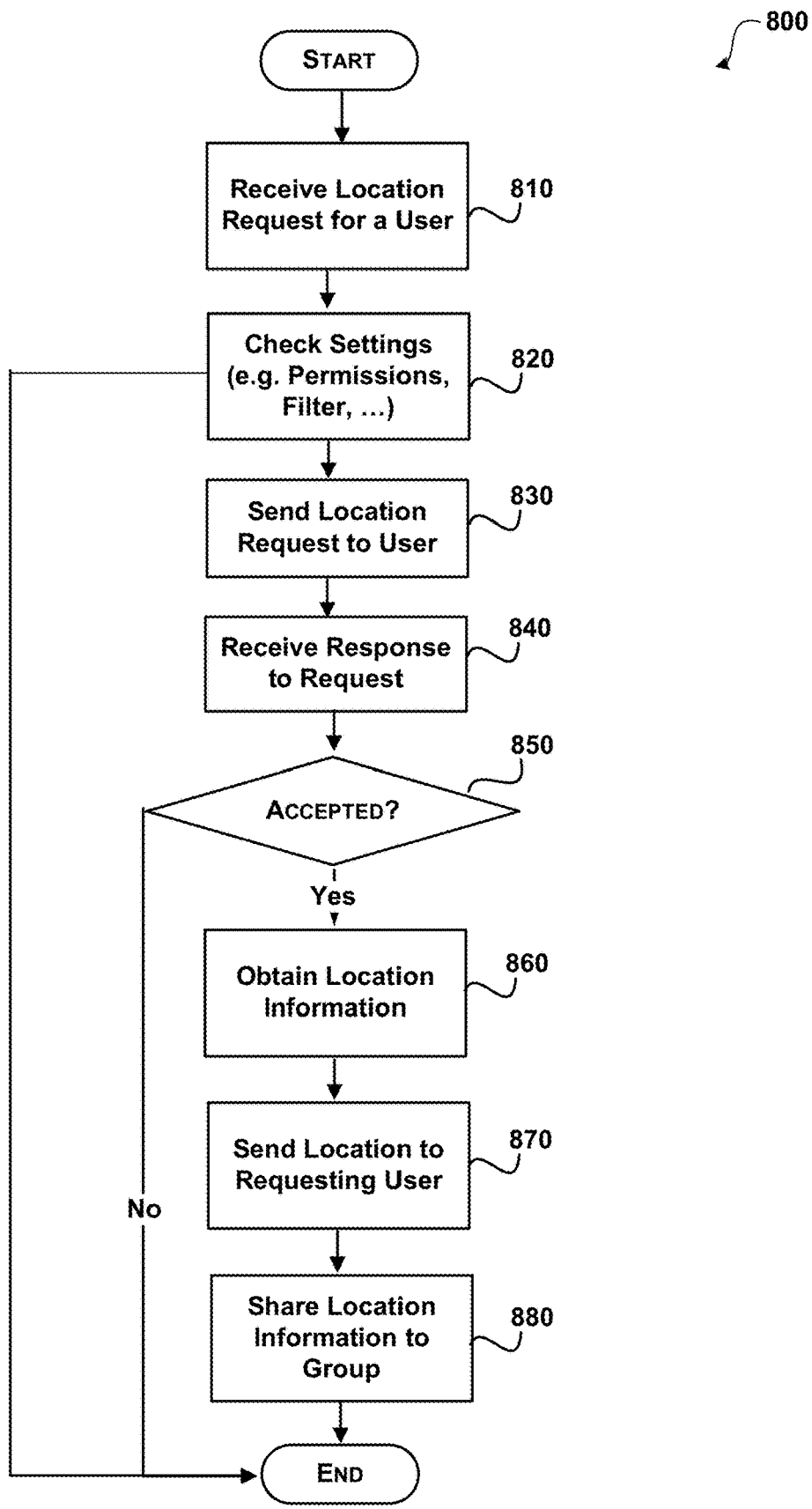
FIG. 8 illustrates a process for providing location information in response to a location request.

FIG. 8 illustrates a process for providing location information in response to a location request. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrating and making up the embodiments described herein are referred to variously as operations, structural devices, acts or modules. These operations, structural devices, acts and modules may be implemented in software, in firmware, in special purpose digital logic, and any combination thereof. While the operations are shown in a particular order, the order of the operations may change or be performed in parallel, depending on the implementation.

After a start operation, the process moves to operation 810, where a location request is received from a user for a current location of another user. According to an embodiment, both users are members of the same group. For example, each member may be part of a family group, a work group, a friend group, or the like. The location request may be made using different methods. For example, a user interface element may be selected using touch input, speech input, gesture input, and/or some other input method.

Flowing to operation 820, the settings for the user whose location is being requested are checked. The settings checked may include permission settings, group settings and filter settings. For example, an online sharing service may determine whether the requesting user is allowed to access the location of the user (e.g., as determined from user configured settings). The service may also check to make sure the requesting user is a member of the group along with the user whose location is requested. Filter(s) may also be checked to determine if the request is allowed based on filter settings. In general, depending on the filtering criteria, various pieces of the location information may be removed. As described herein, virtually any appropriate criteria may be used in virtually any combination, including identity of requester, class/grouping of requester (e.g., spouse, child, parent, friend, coworker), time, location, and so forth. According to an embodiment, activity information for the user may be used as filtering criteria (e.g., do not report the location to a coworker if the user's current activity is driving, but send the location information if the user is walking). When the requesting user is not allowed to request the location information as determined by checking the settings, the process moves to an end operation.

Transitioning to operation 830, the location request is sent to the user. Different types of messages may be sent to a user requesting their current location. Example message types that may be used include, but are not limited to: toast notifications (e.g., a small informational window); electronic mail (emails); Short Messaging Service (SMS); Multimedia Messaging Service (MMS); Instant Messaging (IM); social network messages; information bar messages (e.g., within a header area); a live tile update (e.g., showing an indication of a message on an icon on a display); and the like.

Flowing to operation 840, a determination is made as to whether a response to the request is received. According to an embodiment, a non-response is considered a rejection. When a response to the location request is received, the process flows to decision operation 850.

At operation 850, a determination is made as to whether the location request was accepted by the user or rejected by the user whose location was requested or by not receiving a response. When the location request is rejected by the user, the process flows to an end block without providing location information to the requesting user. When the location request is accepted, the process transitions to operation 860.

At operation 860, the location information for the user is obtained. According to an embodiment, the location information is not obtained until after the user has accepted the location request. The current location may be determined using automatic methods (e.g., GPS) or manual methods (e.g., user enters location).

Moving to decision operation 870, the location of the user is sent to the requesting user. As discussed herein, the location may be delivered to the requesting user using different methods.

Flowing to operation 880, the location information is automatically shared with the other group members that are authorized (e.g., as determined by checking the settings). Instead of each user having to request the location of the user, the location information is shared with each other group member in response to a user accepting a location request.

The process then flows to an end block and returns to processing other actions.

Figure 9:
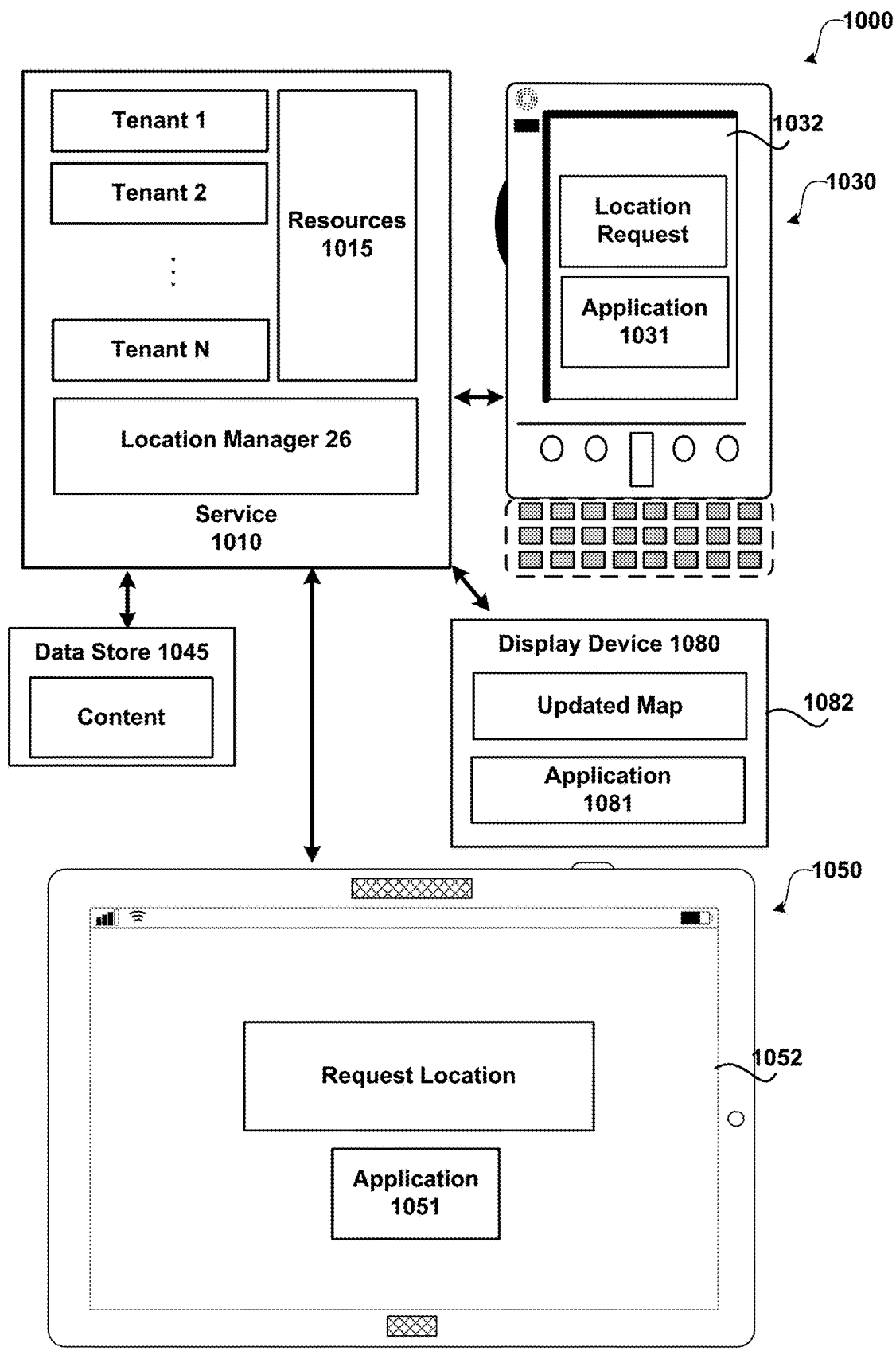
FIG. 9 shows an exemplary online system for requesting and delivering a location of a user.

FIG. 9 illustrates an exemplary online system for requesting and delivering a location of a user. As illustrated, system 1000 includes service 1010, data store 1045, touch screen input device 1050 (e.g., a slate), smart phone 1030 and display device 1080.

As illustrated, service 1010 is a cloud based and/or enterprise based service that may be configured to provide services, such as sharing services as described herein. Sharing functionality may be incorporated into one or more applications (e.g., searching, games, spreadsheets, social network, and the like). The service may be interacted with using different types of input and output. For example, a user may use speech input, touch input, hardware-based input, and the like. The service may provide speech output that combines pre-recorded speech and synthesized speech. Functionality of one or more of the services/applications provided by service 1010 may also be configured as a client/server based application.

As illustrated, service 1010 is a multi-tenant service that provides resources 1015 and services to any number of tenants (e.g., Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device 1050 (e.g., a slate/tablet device) and smart phone 1030 that detects when a touch input has been received (e.g., a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g., a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030, touch screen input device 1050, and device 1080 are configured with multimodal input/output and each include a sharing application (1031, 1051, 1081).

As illustrated, touch screen input device 1050, smart phone 1030, and display device 1080 shows exemplary displays 1052/1032/1082 showing the use of a sharing application as described herein. Data may be stored on a device (e.g., smart phone 1030, slate 1050 and/or at some other location (e.g., network data store 1045). Data store 1045, or some other store, may be used to store contextual information as well as other data. The applications used by the devices may be client based applications, server based applications, cloud based applications and/or some combination. According to an embodiment, display device 1080 is a device such as a MICROSOFT XBOX coupled to a display.

Location manager 26 is configured to perform operations relating to receiving a request for a user and providing location information as described herein. While manager 26 is shown within service 1010, the functionality of the manager may be included in other locations (e.g., on smart phone 1030 and/or slate device 1050 and/or device 1080).

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 10:
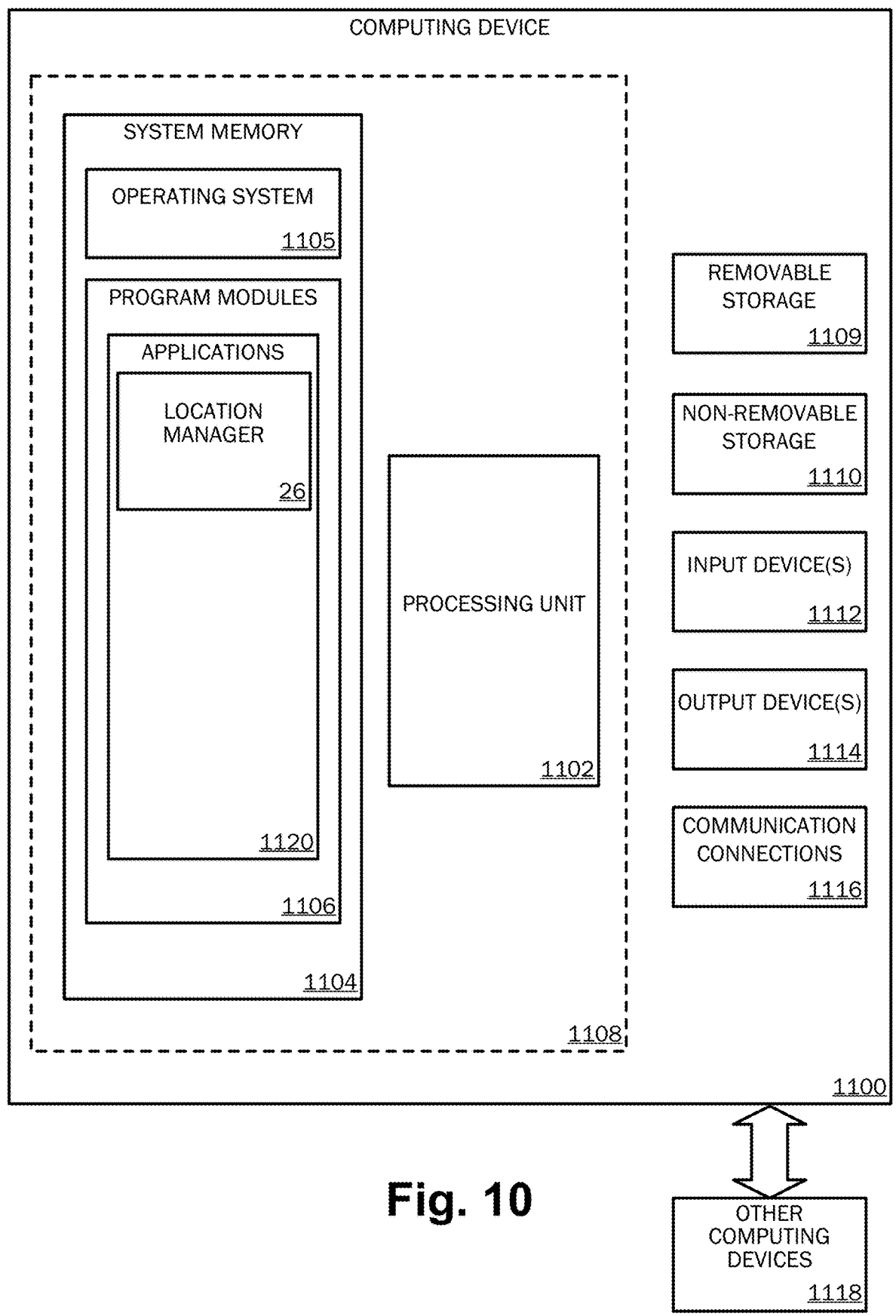
FIGS. 10, 11A, 11B and 12 and the associated descriptions provide a discussion of a variety of operating environments in which embodiments of the invention may be practiced.
Figure 11A:
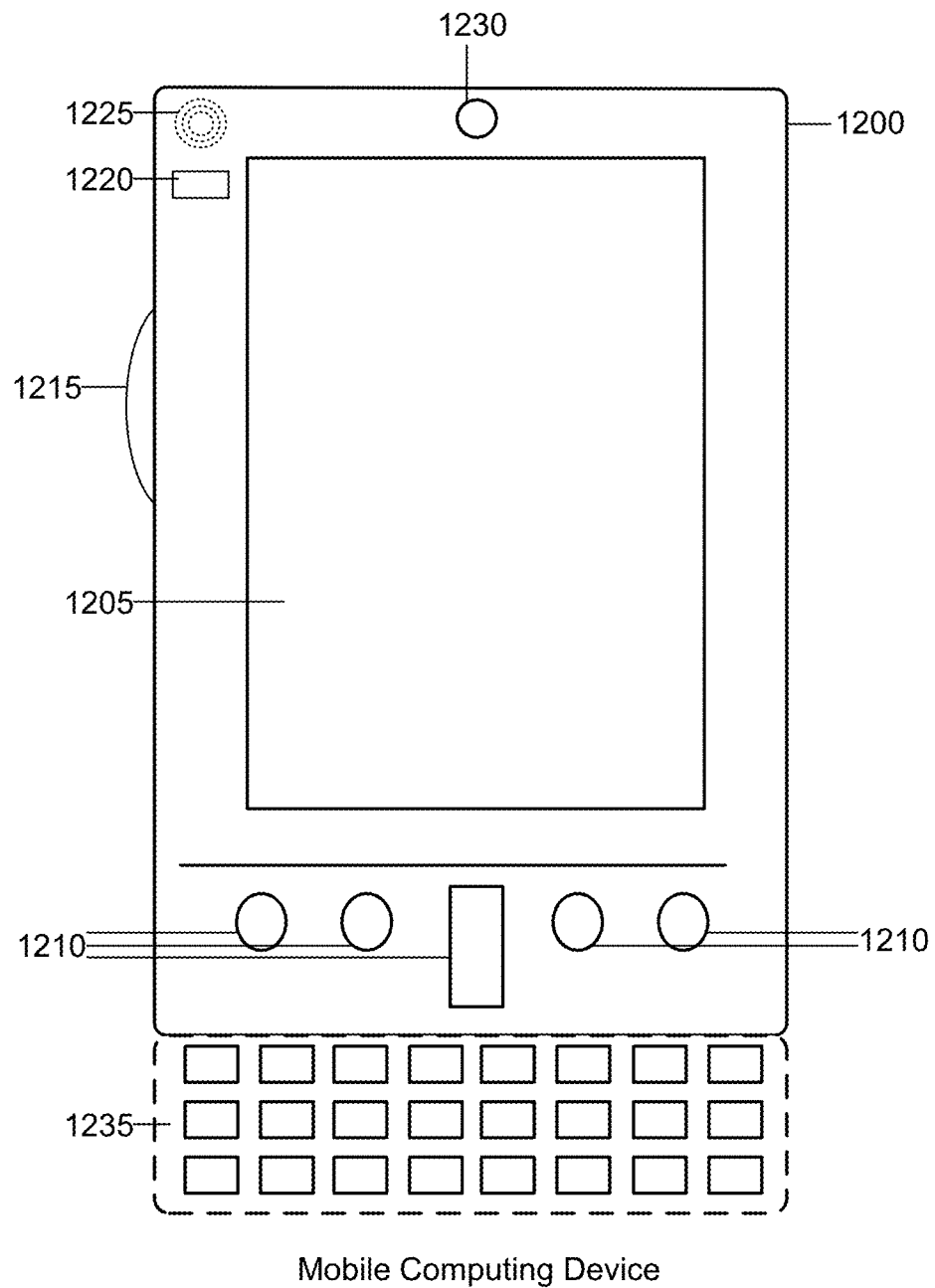
Figure 11B:
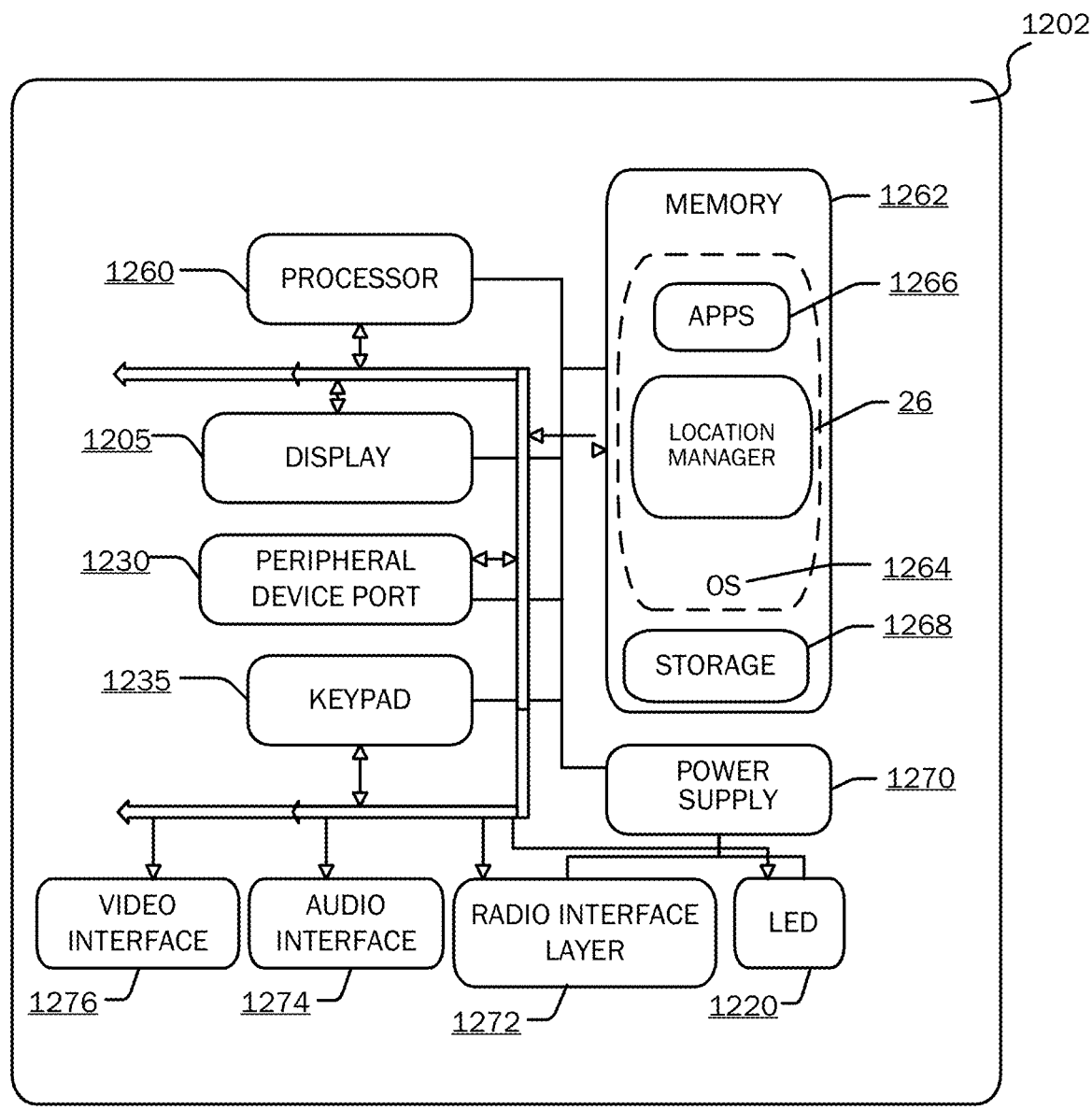
Figure 12:
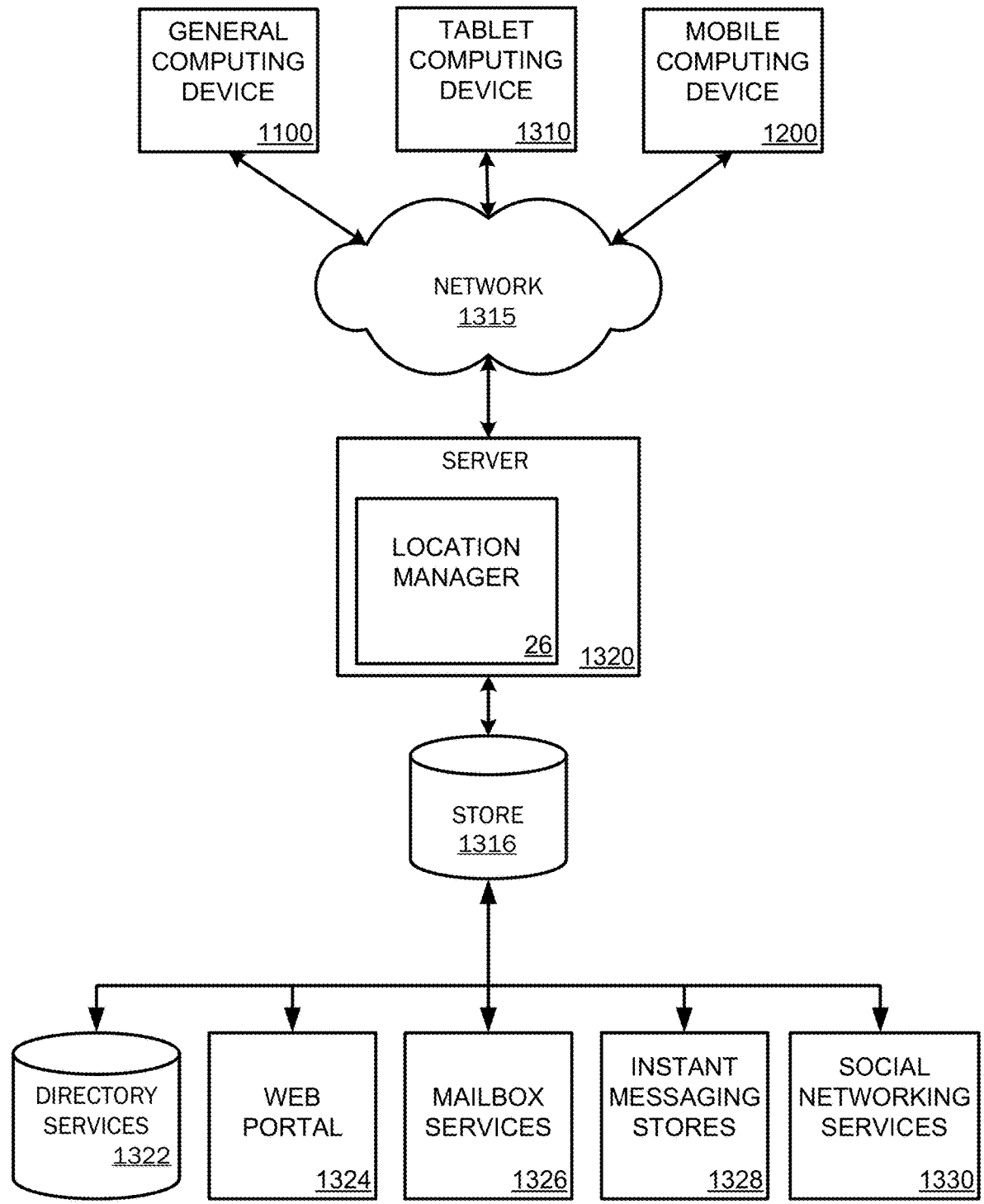

FIGS. 10-12 and the associated descriptions provide a discussion of a variety of operating environments in which embodiments of the invention may be practiced. However, the devices and systems illustrated and discussed with respect to FIGS. 10-12 are for purposes of example and illustration and are not limiting of a vast number of computing device configurations that may be utilized for practicing embodiments of the invention, described herein.

FIG. 10 is a block diagram illustrating physical components (i.e., hardware) of a computing device 1100 with which embodiments of the invention may be practiced. The computing device components described below may be suitable for the computing devices described above. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the location manager 26. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 10 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 10 by a removable storage device 1109 and a non-removable storage device 1110.

As stated above, a number of program modules and data files may be stored in the system memory 1104. While executing on the processing unit 1102, the program modules 1106 (e.g., the location manager 26) may perform processes including, but not limited to, one or more of the stages of the methods and processes illustrated in the figures. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the location manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1200, for example, a mobile telephone, a smart phone, a tablet personal computer, a laptop computer, and the like, with which embodiments of the invention may be practiced. With reference to FIG. 11A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one embodiment of a mobile computing device. That is, the mobile computing device 1200 can incorporate a system 1202 (i.e., an architecture) to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the location manager 26 as described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator

1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present invention, the microphone may also serve as an audio sensor to facilitate control of notifications, as will be described below. The system 1202 may further include a video interface 1276 that enables an operation of an on-board camera to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 11B by the non-volatile storage area 1268. Mobile computing device 1200 may also include peripheral device port 1230.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 12 illustrates an embodiment of an architecture of an exemplary system, as described above. Content developed, interacted with, or edited in association with the location manager 26 may be stored in different communication channels or other storage types. For example, various documents may be stored using a directory service 1322, a web portal 1324, a mailbox service 1326, an instant messaging store 1328, or a social networking site 1330. The location manager 26 may use any of these types of systems or the like for enabling data utilization, as described herein. A server 1320 may provide the location manager 26 to clients. As one example, the server 1320 may be a web server providing the location manager 26 over the web. The server 1320 may provide the location manager 26 over the web to clients through a network 1315. By way of example, the client computing device may be implemented as the computing device 1100 and embodied in a personal computer, a tablet computing device 1310 and/or a mobile computing device 1200 (e.g., a smart phone). Any of these embodiments of the client computing device 1100, 1310, and 1200 may obtain content from the store 1316.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for selectively sharing location information, comprising:
   creating a group of users that includes at least a first user and a second user;
   receiving from a first device of the first user, settings criteria for authorizing sharing of specific location information of the first device of the first user;
   receiving, from a second device of the second user of the group of users, a request for location information of the first device of the first user of the group of users;
   determining whether the second user is authorized to receive the location information of the first device of the first user based on a group setting and one or more of a permission setting and a filter setting received from the first user;
   upon determining that the second user is authorized to receive the location information of the first device of the first user, delivering the location information request to the first device of the first user for acceptance or rejection;
   upon determining that the location information request is accepted by the first user, obtaining the requested location information of the first device of the first user; and
   sharing the obtained location information of the first device of the first user with the second device of the second user.

2. The method of claim 1 further comprising: receiving an update of a current location of the first device of the first user and a time of the update.

3. The method of claim 1 further comprising:
   sending to the first device of the first user a request to share location information with the second user; and
   receiving from the first device of the first user an acceptance of the request to share location information with the second user.

4. The method of claim 1 further comprising:
receiving a permission from the first device of the first user to share location information for the first user with one or more members of the group of users.

5. The method of claim 4 further comprising:
receiving a filter from the first user instructing the sharing service to not share location information with the one or more members of the group of users.

6. The method of claim 1, wherein the group of users further comprises a third user and the method further comprises:
receiving a permission from the first device of the first user to share location information for the first user with the second user but not with a device of the third user.

7. The method of claim 1 further comprising:
receiving a permission from the first device of the first user to share location information for the first device of the first user with the second device of the second user before receiving the location request from the second device of the second user requesting the location information of the first device of the first user.

8. The method of claim 1 wherein sharing the location information of the first device of the first device of the first user further comprises:
sending to the second device of the second user a map view that shows a current location of the first device of the second user.

9. The method of claim 1 wherein sharing the location information of the first device of the first user further comprises:
prior to sharing the location information, determining that the first user and the second user are members of the same group of users.

10. The method of claim 1 further comprising:
determining that the second user is authorized to receive the location information of the first device of the first user based a group setting of the first user.

11. A computer-readable storage device storing computer-executable instructions for sharing a location of a group member, wherein execution of the instructions by one or more processors causes the one or more processors to perform operations comprising:
creating a group of members comprising a plurality of group members including a first group member and a second group member;
receiving from a first device of the first group member, settings criteria for authorizing sharing of specific location information of a first device of the first group member;
receiving, from a second device of the second group member of the group of members, a request for location information of the first device of the first group member;
upon a determination that the second group member is authorized to receive the location information of the first device of the first group member based a group setting and one or more of a permission setting and a filter setting, providing the location information request to the first device of the first group member for acceptance or rejection;
upon determining that the location information request is accepted by the first group member, obtaining the requested location information of the first device of the first group member; and
sharing the obtained location information of the first device of the first group member with the second device of the second group member.

12. The computer-readable storage device of claim 11, further comprising: receiving an update comprising a current location of the first device of the first group member and a time of the update.

13. The computer-readable storage device of claim 11 further comprising computer-executable instructions that when executed by the one or more processors causes the one or more processors to perform operations comprising:
determining that the second group member is authorized to receive the location information of the first device of the first group member based, at least in part, on a group setting of the second group member.

14. The computer-readable storage device of claim 13 further comprising computer-executable instructions that when executed by the one or more processors causes the one or more processors to perform operations comprising:
determining that the second group member is authorized to receive the location information of the first device of the first group member based on a match between the group setting of the first group member and the group setting of the second group member.

15. The computer-readable storage device of claim 11 further comprising computer-executable instructions that when executed by the one or more processors causes the one or more processors to perform operations comprising:
sending to the second device of the second group member a map view that shows a current location of the first device of the first group member.

16. The computer-readable storage device of claim 15 further comprising computer-executable instructions that when executed by the one or more processors causes the one or more processors to perform operations comprising:
sending an updated a map view that shows an updated location of the first device of the first group member.

17. The computer-readable storage device of claim 15 further comprising computer-executable instructions that when executed by the one or more processors causes the one or more processors to perform operations comprising:
receiving a filter from the first group member instructing the sharing service to not share location information with the second group member; and
sending an updated map view to the second device of the second group member that omits location information for the first device of the first group member.

18. A sharing service system for a group of users, comprising:
a processor and memory;
an operating environment executing using the processor; and
a location manager that is configured to perform actions comprising:
maintaining a group of users, wherein each of the users is a member of the group of users;
receiving from a first device of a first user of the group of users, settings criteria for authorizing sharing a location of the first device of the first user;
receiving, from a second device of a second user of the group of users, a request for location information of the first device of the first user of the group of users;
upon receipt of the location request, determining whether second user is authorized to receiving location information of the first device of the first user based on a group setting and one or more of a permission setting and a filter setting;
upon determining that the location information for the first device of the first user is authorized to be shared with the second user in response to the location request, obtaining the location information of the first device of the first user; and sharing the obtained location information of the first device of the first user with the second device of the second user.

19. The sharing service system of claim 18 wherein the location manager is configured to perform actions further comprising:

receive a permission from the first user to share location information for the first device of the first user with one or more members of the group of users.

20. The sharing service system of claim 18 wherein the group of users further comprises a third user and the location manager is configured to perform actions further comprising:

receiving a permission from the first user to share location information for the first device of the first user with the second user but not with a device of the third user.

* * * * *